Patented May 3, 1927.

1,626,800

UNITED STATES PATENT OFFICE.

MARCUS J. FESSLER, OF SYRACUSE, NEW YORK.

PROCESS OF RECLAIMING RUBBER.

No Drawing.    Application filed January 29, 1927. Serial No. 164,654.

This invention relates to a process for reclaiming rubber from old or pre-used articles of manufacture, such as tires, inner tubes, water bags and other rubber compounds or products which have been more or less vulcanized and contain a greater or less quantity of sulphur, fiber and other foreign matter reference being had to my pending application Serial No. 108,963, filed May 13, 1926, of which this application is a continuation in part.

I have found and believe that I am the first to discover that the rubber constituent of this old rubber stock, when properly comminuted and washed, may be devulcanized and reclaimed by subjecting the same to a treatment of hydrogenated naphthalene, or any one or more of the hydrogenated hydro-carbons of the naphthalene series in suitable proportions, and the main object of the present invention is to make use of this hydrogenated naphthalene as a devulcanizing agent in the reclamation of the rubber from old rubber compounds and thereby to greatly expedite the work of reclamation at a correspondingly reduced cost, and at the same time to produce a better quality of reclaimed rubber.

Another object is to reclaim the rubber from old rubber compounds containing more or less fiber in such manner that all or some of the fiber in its original or comminuted form may be retained in the reclaimed product to serve as a bond or filler according to the use to which said product may be put.

Other objects and uses will be brought out in the following description:—

In carrying out the objects stated, the old, or pre-used rubber-containing stock is first reduced to a finely divided or comminuted state by any suitable mechanical means, such as milling, or grinding, or by any known triturating or levigating process.

This comminuted stock is then subjected to a thorough washing in water, or other suitable liquid, to remove dirt and other loose, foreign matter, after which the washed stock may be boiled in dilute sulphuric acid, or its equivalent, for dissolving out, separating and removing the residue foreign matter, leaving the remaining stock in a more or less moistened condition.

The sulphuric acid or its equivalent may be sufficiently strong to entirely destroy any fiber which the comminuted stock may retain after washing, but in some cases it may be desired to retain this fiber in its original state as a bond for the rubber, or in a disintegrated state as a filler for the rubber, in which case the acid would be weakened to a degree sufficient to preserve the fiber in one state or the other.

This moistened stock is washed to free it from acid, and then dried by any suitable drying process, preferably by one of the well known vacuum drying processes, and the dry stock is then placed in a steam-jacketed receptacle where it is agitated and simultaneously heated by the steam in the jacket at about seventy-five (75) pounds pressure, or at a temperature of approximately 160 degree C.

While the dry comminuted stock in the kettle is being agitated and heated, a devulcanizing agent consisting of hydrogenated hydro-carbon of the naphthalene series, or an hydrogenated naphthalene in about the proportion of 25% more or less of the weight of the mass, is added to the stock in the kettle, and the kettle is then closed and sealed and the agitation and heating continued for a period of about two (2) hours, more or less.

While any one or more of the hydrogenated hydro-carbons of the naphthalene series may be used as the devulcanizing agent with greater or less expediency and economy, I have found that the following are most practicable and expeditious:—

(1) Di-hydro naphthalene.
(2) Tetra-hydro naphthalene.
(3) Hexa-hydro naphthalene.
(4) Deca-hydro naphthalene.
(5) Di-hydro-beta naphthol.
(6) Tetra-hydro-alpha and beta naphthol.
(7) Deca-hydro-alpha and beta naphthol.
(8) Tetra-hydro-alpha and beta naphthylamine.
(9) Deca-hydro-alpha and beta naphthylamine.

It is to be understood, however, that this invention contemplates the use of any hydrogenated hydro-carbons of the naphthalene series alone or in combination, as a devulcanization agent, and in such proportions and at such temperatures as may prove most expeditious, according to the nature, quality or quantity of the stock under treatment for reclaiming the rubber.

This de-vulcanized stock, while still in the kettle, is next subjected to a distilling (preferably by vacuum) process for removing any excess or residue of the devulcanizing agent or hydrogenated naphthalene which may be left following the devulcanizing process, when steam is preferably introduced into the mass to accelerate the expulsion of the last traces of the hydrogenated naphthalene compound, thus completing the reclamation process to produce the desired reclaimed rubber.

While the vacuum in the kettle is still maintained, the steam pressure in the jacket is reduced to about twenty-five (25) pounds more or less for drying the reclaimed rubber which may then be removed from the kettle and rolled, or otherwise treated for remanufacture into useful products.

What I claim is:

1. The herein described process of reclaiming rubber from old or used rubber stock, comprising the reduction of the stock to a finely divided or comminuted state, and subjecting the comminuted mass to a treatment of hydrogenated naphthalene as a devulcanizing agent.

2. The herein described process of reclaiming rubber from old or used rubber stock by the use of an hydrogenated hydrocarbon of the naphthalene series as the devulcanizing agent.

3. The herein described process of reclaiming rubber from old or used rubber stock, comprising the reduction of the stock to a finely divided or comminuted state, heating the stock to a predetermined temperature in the presence of an hydrogenated hydrocarbon of the naphthalene series as the devulcanizing agent.

4. The herein described process of reclaiming rubber from old or used rubber stock, comprising the reduction of the stock to a finely divided or comminuted state, washing the stock and treating it with dilute sulphuric acid and subsequently adding an hydrogenated naphthalene in the proportion of about 25% of its weight for devulcanizing the rubber in the stock.

5. The herein described process of reclaiming rubber from old or used rubber stock, comprising the reduction of the stock to a finely divided or comminuted state, washing the stock and treating it with dilute sulphuric acid and subsequently adding an hydrogenated naphthalene in the proportion of about 25% of its weight for devulcanizing the rubber in the stock, and finally distilling off the excess hydrogenated naphthalene.

6. The herein described process of reclaiming rubber from old or used rubber stock, comprising the reduction of the stock to a finely divided or comminuted state, washing the stock and treating it with dilute sulphuric acid, again washing the stock to remove the acid, drying the stock, and subsequently treating with a hydrogenated hydro-carbon of the naphthalene series in about the proportion of 25% of the weight of the rubber stock, and finally distilling off the excess hydrogenated hydro-carbon of the naphthalene series.

7. The herein described process of reclaiming rubber from vulcanized stock comprising the reduction of the stock to a finely comminuted state, adding to the comminuted stock tetrahydronaphthalene in about the proportion of 25% of weight of the stock, and agitating the mixture in the presence of heat sufficient to cause the liberation of combined sulphur.

8. The herein described process of reclaiming rubber from old or used rubber stock, comprising the reduction of the stock to a finely divided or comminuted state, and subjecting the comminuted mass to the treatment of tetrahydronaphthalene.

In witness whereof I have hereunto set my hand this 13th day of January, 1927.

MARCUS J. FESSLER.